(12) United States Patent
Doi (10) Patent No.: US 11,919,369 B2
(45) Date of Patent: Mar. 5, 2024

(54) VEHICLE

(71) Applicant: TOYOTA JIDOSHA KABUSHIKI KAISHA, Aichi-ken (JP)

(72) Inventor: Madoka Doi, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 133 days.

(21) Appl. No.: 17/564,210

(22) Filed: Dec. 29, 2021

(65) Prior Publication Data

US 2022/0250442 A1    Aug. 11, 2022

(30) Foreign Application Priority Data

Feb. 5, 2021    (JP) .................................. 2021-017482

(51) Int. Cl.
  *B60H 1/24*    (2006.01)
  *B60H 1/34*    (2006.01)
  *B60J 3/00*    (2006.01)
  *B60J 3/02*    (2006.01)

(52) U.S. Cl.
  CPC ............. *B60H 1/245* (2013.01); *B60H 1/242* (2013.01); *B60H 1/3414* (2013.01); *B60J 3/007* (2013.01); *B60J 3/0204* (2013.01)

(58) Field of Classification Search
  CPC ...... B60H 1/242; B60H 1/245; B60H 1/3414; B60H 1/00742; B60J 3/007; B60J 3/0204
  USPC ......................................................... 454/146
  See application file for complete search history.

(56) References Cited

U.S. PATENT DOCUMENTS

| 2007/0222252 A1* | 9/2007 | Suzuki ................... B60J 3/0204 |
| | | 296/97.8 |
| 2017/0151956 A1* | 6/2017 | Boesen ............. G07C 9/00309 |
| 2021/0129624 A1* | 5/2021 | Nagahama ......... B60H 1/00871 |

FOREIGN PATENT DOCUMENTS

JP    200824224 A    2/2008

* cited by examiner

*Primary Examiner* — Allen R. B. Schult
(74) *Attorney, Agent, or Firm* — HAUPTMAN HAM, LLP (57) ABSTRACT

In a vehicle, a flow adjusting plate is placed along an upper edge part of a front windshield, so that the flow of wind flowing along an inner surface of the front windshield is adjustable by the flow adjusting plate. Further, the angle of the flow adjusting plate from the inner surface is adjustable, so that the flow adjusting plate allows the direction of the wind flowing along the inner surface to be directed toward a seat placed behind an instrument panel in the vehicle front-rear direction.

7 Claims, 9 Drawing Sheets

VEHICLE

CROSS-REFERENCE TO RELATED APPLICATION

This application claims priority to Japanese Patent Application No. 2021-017482 filed on Feb. 5, 2021, incorporated herein by reference in its entirety.

BACKGROUND

1. Technical Field

The disclosure relates to a vehicle.

2. Description of Related Art

Japanese Unexamined Patent Application Publication No. 2008-24224 (JP 2008-24224 A) describes a vehicle air-conditioning device. The vehicle air-conditioning device causes external air to partially flow along a front windshield via an evaporator, thereby making it possible to restrain the front windshield from fogging up. Further, in JP 2008-24224 A, a draft door is provided in a roof, and the opening degree of the draft door is controllable by an actuator. Then, wind flowing along the front windshield flows to outside a vehicle cabin via the draft door. Accordingly, the vehicle air-conditioning device described in JP 2008-24224 A can restrain the wind flowing along the front windshield from affecting air-conditioning to a seat on the rear side in the vehicle front-rear direction.

SUMMARY

Meanwhile, in the related art, it is necessary to secure a blow opening from which air is sent toward a seat on the front side in the vehicle front-rear direction, in addition to a blow opening for the wind flowing along the front windshield. In view of this, it is necessary to expand an instrument panel in the vehicle front-rear direction. That is, the related art has room for improvement in that, while an air-conditioning environment inside the vehicle cabin is maintained in a good state, the width of the instrument panel in the vehicle front-rear direction is reduced.

The present disclosure is achieved in consideration of the above fact, and an object of the present disclosure is to achieve a vehicle that can maintain an air-conditioning environment inside a vehicle cabin in a good state and achieve a reduction in the width of an instrument panel in the vehicle front-rear direction.

A vehicle according to a first aspect of the present disclosure includes an air-conditioning device, a blow opening portion, a vehicle seat, and a flow adjusting portion. The air-conditioning device is provided in the vehicle and configured to perform air-conditioning inside a vehicle cabin of the vehicle. The blow opening portion is provided on a top surface of an instrument panel placed on a front side in the vehicle front-rear direction inside the vehicle cabin. The blow opening portion is configured to cause wind blown out of the air-conditioning device to flow along an inner surface of a front windshield placed in front of the instrument panel in the vehicle front-rear direction, the inner surface facing an inner side of the vehicle cabin. The vehicle seat is placed behind the instrument panel in the vehicle front-rear direction. The flow adjusting portion is placed along an upper edge part of the front windshield such that an angle of the flow adjusting portion from the inner surface is adjustable. The flow adjusting portion is configured to adjust the flow of the wind flowing along the inner surface such that the wind flows toward the vehicle seat side.

In the vehicle according to the first aspect of the present disclosure, the vehicle is provided with the air-conditioning device, and air-conditioning inside the vehicle cabin of the vehicle is performed by the air-conditioning device.

In the meantime, in order to cause the wind from the air-conditioning device to flow toward a seat on the front side in the vehicle front-rear direction, it is necessary to provide, in the instrument panel, a blow opening via which air can be sent toward the seat. Accordingly, it is necessary to expand the instrument panel in the vehicle front-rear direction.

Here, in the present disclosure, the instrument panel is placed on the front side in the vehicle front-rear direction inside the vehicle cabin, and the blow opening portion for the wind from the air-conditioning device is provided on the top surface of the instrument panel. The wind blown out of the air-conditioning device passes through the blow opening portion, so that the wind flows along the inner surface of the front windshield, the inner surface facing the inner side of the vehicle cabin.

Further, the flow adjusting portion is placed along the upper edge part of the front windshield, and the flow of the wind flowing along the inner surface of the front windshield is adjustable by the flow adjusting portion. Further, the angle of the flow adjusting portion from the inner surface of the front windshield is adjustable, the inner surface facing the inner side of the vehicle cabin. The flow adjusting portion allows the direction of the wind flowing along the inner surface of the front windshield to be directed toward the vehicle seat placed behind the instrument panel in the vehicle front-rear direction.

As a result, in the present disclosure, without providing, in the instrument panel, a blow opening via which the wind can be sent toward the vehicle seat, it is possible to cause the wind blown out of the air-conditioning device to flow toward the vehicle seat.

A vehicle according to a second aspect of the present disclosure may be configured as follows. That is, in the vehicle according to the first aspect, the flow adjusting portion may be storable in a roof trim constituting a ceiling surface of the vehicle cabin.

With the vehicle according to the second aspect of the present disclosure, in a state where the air-conditioning device is not activated, the flow adjusting portion is stored in the roof trim constituting the ceiling surface of the vehicle cabin, so that the flow adjusting portion can be made inconspicuous.

Further, a vehicle according to a third aspect of the present disclosure may be configured as follows. That is, the vehicle according to the second aspect may further include an activation controlling portion configured to drive the flow adjusting plate from a non-usage state to a usage state when the air-conditioning device is activated, the non-usage state being a state where the flow adjusting portion is stored in the roof trim, the usage state being a state where the flow of the wind flowing along the inner surface is adjustable by the flow adjusting portion.

The vehicle according to the third aspect of the present disclosure includes the activation controlling portion configured to drive the flow adjusting portion. At the time when the air-conditioning device is activated, the activation controlling portion drives the flow adjusting portion from the non-usage state where the flow adjusting portion is stored in the roof trim to the usage state where the flow of the wind flowing along the inner surface of the front windshield is adjustable by the flow adjusting portion.

A vehicle according to a fourth aspect of the present disclosure may be configured as follows. That is, the vehicle according to the second or third aspect may further include a shielding portion placed on the upper side, in the vehicle up-down direction, of the vehicle cabin, the shielding portion being configured to block at least part of light applied from the front windshield side to an occupant seated in the vehicle seat. The shielding portion may be extendable from the roof trim along the inner surface.

In the vehicle according to the fourth aspect of the present disclosure, the shielding portion is placed on the upper side, in the vehicle up-down direction, of the vehicle cabin, so that light applied from the front windshield side to the occupant seated in the vehicle seat can be at least partially blocked by the shielding portion. Accordingly, for example, in a case where sunlight is applied from the front windshield side to the occupant seated in the vehicle seat, it is possible to reduce the amount of the light applied to the occupant side.

Further, in the present disclosure, the shielding portion is extendable from the roof trim along the inner surface of the front windshield. This accordingly makes it possible to restrain the shielding portion from hindering the wind the flow of which is adjusted by the flow adjusting portion.

A vehicle according to a fifth aspect of the present disclosure may be configured as follows. That is, in the vehicle according to any one of the first to fourth aspects, a position of the vehicle seat in the vehicle front-rear direction may be changeable. The vehicle may further include: an angle adjusting portion configured to adjust the angle by driving the flow adjusting portion; and a seat position detecting portion configured to detect the position of the vehicle seat in the vehicle front-rear direction. The angle adjusting portion may adjust the angle based on the position of the vehicle seat, the position being detected by the seat position detecting portion.

With the vehicle according to the fifth aspect of the present disclosure, the position of the vehicle seat in the vehicle front-rear direction can be changed to a position preferred by the occupant.

In the meantime, when the position of the vehicle seat in the vehicle front-rear direction is changed, the positional relationship between the flow adjusting portion and the vehicle seat is changed. Accordingly, it is necessary to adjust the angle of the flow adjusting portion from the inner surface of the front windshield again. Meanwhile, from the viewpoint of convenience for the occupant, it is not preferable that the adjustment of the flow adjusting portion be performed by the occupant every time the position of the vehicle seat in the vehicle front-rear direction is changed.

Here, in the present disclosure, when the flow adjusting portion is driven by the angle adjusting portion, the angle of the flow adjusting portion from the inner surface of the front windshield can be adjusted. Further, the position of the vehicle seat in the vehicle front-rear direction can be detected by the seat position detecting portion. Then, the angle adjusting portion adjusts the angle of the flow adjusting portion from the inner surface of the front windshield based on the position of the vehicle seat that is detected by the seat position detecting portion.

On this account, in the present disclosure, the angle of the flow adjusting portion from the inner surface of the front windshield can be adjusted to an appropriate angle for the vehicle seat without the occupant operating the flow adjusting portion.

A vehicle according to a sixth aspect of the present disclosure may be configured as follows. That is, the vehicle according to the fifth aspect may further include a self-driving controlling portion configured to control motion of the vehicle such that the vehicle performs self-driving.

With the vehicle according to the sixth aspect of the present disclosure, the motion of the vehicle can be controlled by the self-driving controlling portion such that the vehicle performs self-driving. On this account, in the present disclosure, when the position of the vehicle seat in the vehicle front-rear direction is changed or the like, the occupant seated in the vehicle seat can take a posture other than a driving position. Further, as described above, the angle of the flow adjusting portion from the inner surface of the front windshield is adjusted in accordance with the position of the vehicle seat in the vehicle front-rear direction.

A vehicle according to a seventh aspect of the present disclosure may be configured as follows. That is, in the vehicle according to any one of the first to sixth aspect, a vertical wall portion constituting part of the instrument panel and placed in front of the vehicle seat in the vehicle front-rear direction may be extended downward in the vehicle up-down direction from a rear peripheral edge part, in the vehicle front-rear direction, of the blow opening portion when the vertical wall portion is viewed from the vehicle width direction.

In the vehicle according to the seventh aspect of the present disclosure, the vertical wall portion constituting part of the instrument panel is placed in front of the vehicle seat in the vehicle front-rear direction. The vertical wall portion is extended downward in the vehicle up-down direction from the rear peripheral edge part, in the vehicle front-rear direction, of the blow opening portion. On this account, in the present disclosure, it is possible to restrain the width of the instrument panel in the vehicle front-rear direction to a minimum requirement.

As described above, the vehicle according to the first aspect of the present disclosure yields such an excellent effect that, while an air-conditioning environment inside the vehicle cabin is maintained in a good state, the width of the instrument panel in the vehicle front-rear direction can be reduced.

The vehicle according to the second aspect of the present disclosure can yield such an excellent effect that it is possible to secure the design property inside the vehicle cabin in a state where the air-conditioning device is not activated.

The vehicle according to the third aspect of the present disclosure can yield such an excellent effect that it is possible to adjust the direction of the wind blown out of the air-conditioning device without performing a manual operation.

The vehicle according to the fourth aspect of the present disclosure can yield such an excellent effect that it is possible to secure the field of view of the occupant while the air-conditioning environment inside the vehicle cabin is maintained in a good state.

The vehicle according to the fifth aspect of the present disclosure can yield such an excellent effect that the occupant can spend time comfortably inside the vehicle cabin without impairing convenience for the occupant.

The vehicle according to the sixth aspect of the present disclosure can yield such an excellent effect that the occupant can take various postures during traveling of the vehicle, and the air-conditioning environment around the occupant can be maintained in a good state.

The vehicle according to the seventh aspect of the present disclosure can yield such an excellent effect that the interval between the instrument panel and the vehicle seat in the vehicle front-rear direction can be increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

With reference to FIGS. 1 to 8, the following describes a first embodiment of a vehicle according to the present disclosure. Note that an arrow FR illustrated appropriately in each figure indicates the front side in the vehicle front-rear direction, an arrow UP indicates the upper side in the vehicle up-down direction, and an arrow OUT indicates the outer side in the vehicle width direction.

Figure 1:
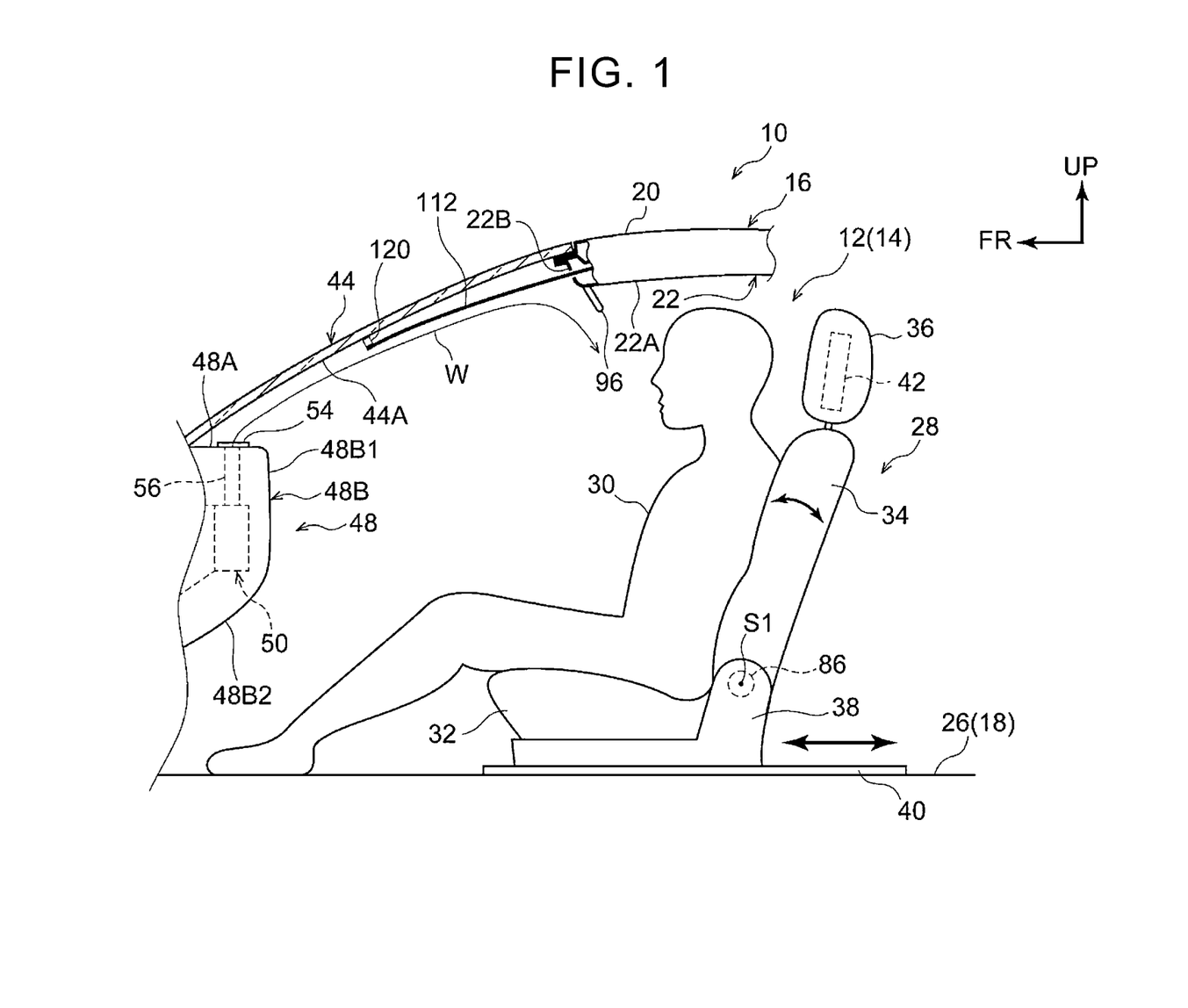
FIG. 1 is a side view schematically illustrating a configuration of a vehicle according to a first embodiment.

First described is a schematic configuration of a "vehicle 10" according to the present embodiment with reference to FIG. 1. The vehicle 10 includes a vehicle body 14 constituting a main part of a "vehicle cabin 12." An upper part of the vehicle body 14 in the vehicle up-down direction is constituted by a roof portion 16, and a lower part of the vehicle body 14 in the vehicle up-down direction is constituted by a floor portion 18.

Figure 3:
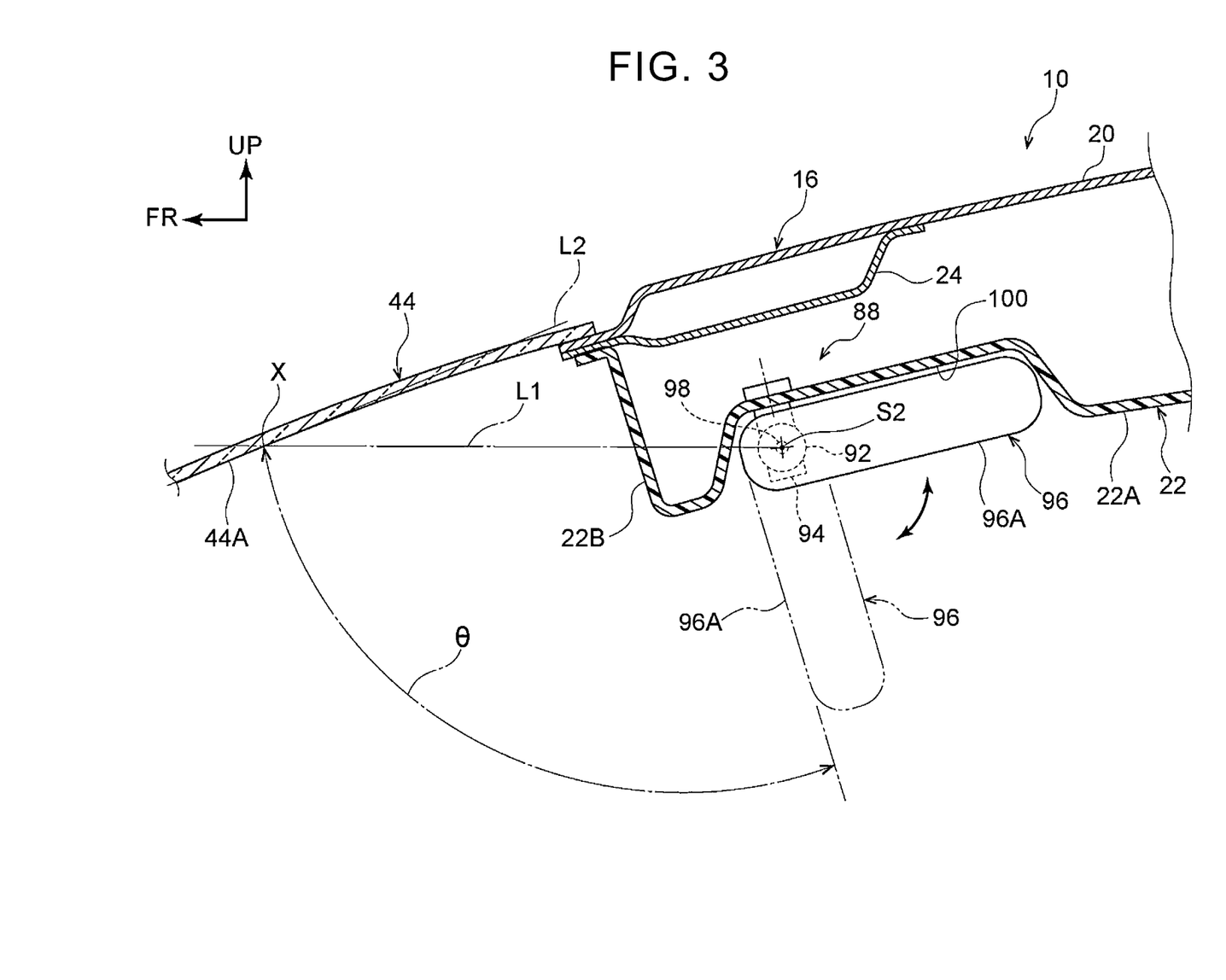
FIG. 3 is a sectional view schematically illustrating a configuration around a flow adjusting portion in the vehicle according to the first embodiment, the configuration being viewed from the vehicle width direction.

The roof portion 16 includes a roof panel 20 extending in the vehicle front-rear direction and in the vehicle width direction and constituting part of the design surface of the vehicle 10. The roof panel 20 is covered with a "roof trim 22" from the lower side in the vehicle up-down direction. As also illustrated in FIG. 3, the roof trim 22 includes a ceiling surface portion 22A constituting a ceiling surface of the vehicle cabin 12 and extending in the vehicle front-rear direction and in the vehicle width direction, and a front wall portion 22B extending upward in the vehicle up-down direction from a front peripheral edge part, in the vehicle front-rear direction, of the ceiling surface portion 22A.

Further, the roof panel 20 is reinforced by a plurality of roof reinforcements 24 provided such that the roof reinforcements 24 are arranged at intervals in the vehicle front-rear direction. The roof reinforcements 24 extend in the vehicle width direction and constitute a closed-section structural portion together with the roof panel 20 such that the section of the closed-section structural portion viewed from the vehicle width direction is formed as a closed section. Note that the roof reinforcement 24 placed on the frontmost side in the vehicle front-rear side most is placed along a front peripheral edge part, in the vehicle front-rear direction, of the roof panel 20. Note that the roof trim 22 is attached to the roof reinforcements 24 by attachment members such as fasteners (not illustrated).

The floor portion 18 includes a floor panel 26 extending in the vehicle front-rear direction and in the vehicle width direction, and a "seat 28" as a vehicle seat is placed in a front part, in the vehicle front-rear direction, of the floor panel 26.

The seat 28 includes a seat cushion 32 where an "occupant 30" is to be seated, a seatback 34 configured to support the back of the occupant 30, and a headrest 36 configured to support the head of the occupant 30. As will be described later, a lower end part of the seatback 34 is turnable relative to a rear end part of the seat cushion 32.

Note that the seat 28 is supported by the floor panel 26 via a seat support portion 38 and a "slider 40" that are placed below the seat 28 in the vehicle up-down direction. Further, an airbag device 42 is provided inside the headrest 36 so that the airbag device 42 can restrict the head of the occupant 30 in case of a collision or the like of the vehicle 10.

In the meantime, a "front windshield 44" is placed in a front part, in the vehicle front-rear direction, of the vehicle body 14 (in front of the seat 28). The front windshield 44 is constituted by a transparent glass plate. The front windshield 44 extends forward in the vehicle front-rear direction and downward in the vehicle up-down direction from a front peripheral edge part, in the vehicle front-rear direction, of the roof portion 16 when the front windshield 44 is viewed from the vehicle width direction. The front windshield 44 curves in a state where its central part swells to project forward in the vehicle front-rear direction. Note that, as illustrated in FIGS. 2, 3, an upper end, in the vehicle up-down direction, of the front windshield 44 is supported by the roof portion 16, and a lower end part, in the vehicle up-down direction, of the front windshield 44 is supported by a cowling portion 46 constituting part of the vehicle body 14.

Further, an "instrument panel 48" made of resin is placed in front of the seat 28 in the vehicle front-rear direction. The instrument panel 48 is supported by an instrument panel reinforcement (not illustrated) provided over between paired front pillars (not illustrated) constituting part of the vehicle body 14. Further, the instrument panel 48 includes an upper wall portion 48A constituting an upper part, in the vehicle up-down direction, of the instrument panel 48, and a "vertical wall portion 48B" constituting a rear part, in the vehicle front-rear direction, of the instrument panel 48. The instrument panel 48 covers a "heating ventilation and air-conditioning (HVAC) unit 50" as an air-conditioning device from the rear side in the vehicle front-rear direction.

Figure 2:
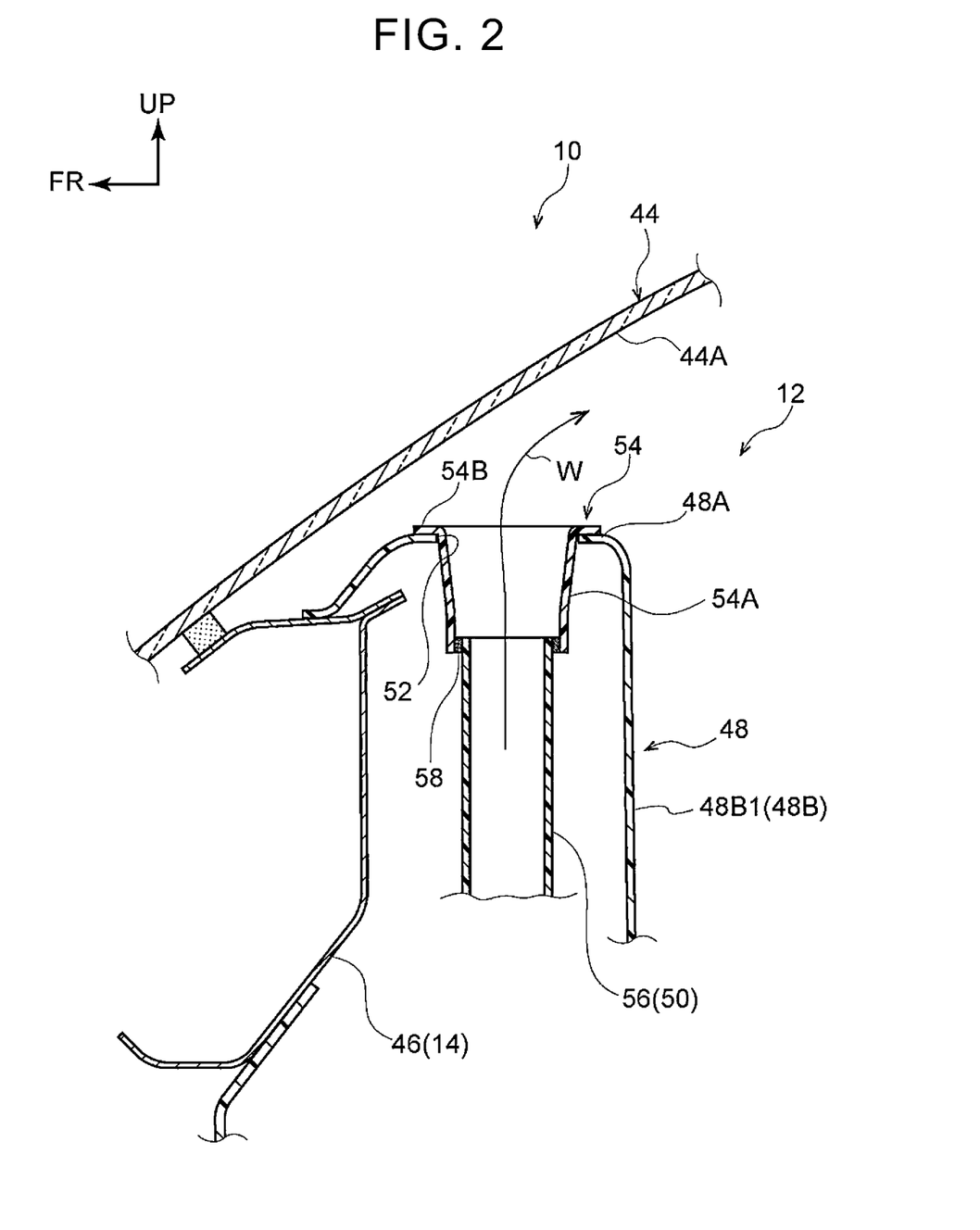
FIG. 2 is a sectional view schematically illustrating a configuration around a blow opening portion for air-conditioning in the vehicle according to the first embodiment, the configuration being viewed from the vehicle width direction.

More specifically, as illustrated in FIG. 2, the upper wall portion 48A of the instrument panel 48 has a plate shape having a plate-thickness direction along the vehicle up-down direction and extending in the vehicle width direction. Further, the upper wall portion 48A has an opening 52 opened in the vehicle up-down direction, and a "blow opening portion 54" is attached to the opening 52.

The blow opening portion 54 includes a tubular main body portion 54A via which the inside of the instrument panel 48 communicates with the outside thereof in the vehicle up-down direction, and an extension portion 54B extending from an upper end part, in the vehicle up-down direction, of the main body portion 54A toward an outer peripheral side of the main body portion 54A.

The blow opening portion 54 is fitted to the opening 52 of the instrument panel 48 from the upper side in the vehicle up-down direction, and a lower end part, in the vehicle up-down direction, of the main body portion MA is connected to a duct 56 of the HVAC unit 50 via as buffer material 58. Hereby, the blow opening portion 54 allows wind W blown out of the HVAC unit 50 to flow along an "inner surface 44A" of the front windshield 44, the inner surface 44A facing the inner side of the vehicle cabin 12.

Referring back to FIG. 1, the vertical wall portion 48B of the instrument panel 48 includes an upper wall portion 48B1 constituting an upper part, in the vehicle up-down direction, of the vertical wall portion 48B, and a lower wall portion 48B2 constituting a lower part, in the vehicle up-down direction, of the vertical wall portion 48B. The upper wall portion 48B1 has a plate-thickness direction along the vehicle front-rear direction and extends downward in the vehicle up-down direction from a rear peripheral edge part, in the vehicle front-rear direction, of the extension portion 54B of the blow opening portion 54. The lower wall portion 48B2 extends forward in the vehicle front-rear direction and downward in the vehicle up-down direction from the upper wall portion 48B1.

Figure 6:
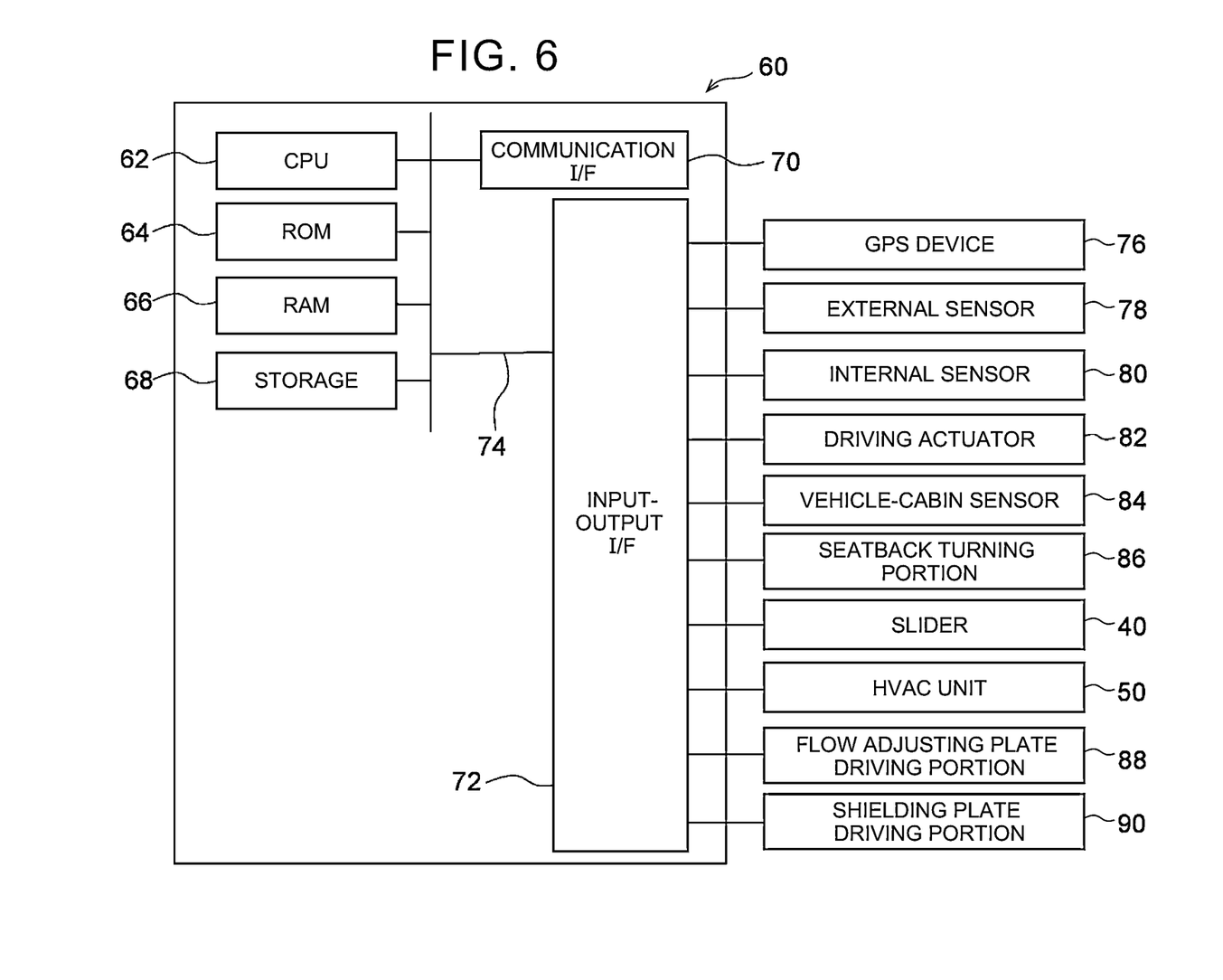
FIG. 6 is a block diagram illustrating a relationship between devices provided in the vehicle according to the first embodiment.

Here, in the present embodiment, as illustrated in FIG. 6, a control device 60 is provided in the vehicle 10. The present embodiment has a feature in that the control device 60 controls various devices provided in the vehicle 10 so that self-driving of the vehicle 10, adjustment of the seat 28, and flow-adjustment of the wind W are enabled. The following describes details of the control device 60 and the various devices to be controlled by the control device 60.

The control device 60 includes a central processing unit (CPU) 62, a read only memory (ROM) 64, a random access memory (RAM) 66, a storage 68, a communication interface (I/F) 70, and an input-output I/F 72. The CPU 62, the ROM 64, the RAM 66, the storage 68, the communication I/F 70, and the input-output I/F 72 are communicably connected to each other via a bus 74.

The CPU 62 is a central processing unit and is configured to control various devices by executing various programs. More specifically, the CPU 62 can read a program from the ROM 64 and execute the program in the RAM 66 as a working area. When execution programs stored in the ROM 64 are read out and executed by the CPU 62, the control device 60 can implement various functions, as described later.

More specifically, various programs and various pieces of data related to the self-driving of the vehicle 10, the adjustment of the seat 28, the flow-adjustment of the wind W, and so on are stored in the ROM 64. In the meantime, a program or data is temporarily storable in the RAM 66 as a working area.

The storage 68 includes a hard disk drive (HDD) or a solid state drive (SSD) such that various programs including an operating system and various pieces of data are storable in the storage 68.

The communication I/F 70 is an interface to be used to connect the control device 60 to various networks and is communicable with a server or the like (not illustrated). Communications standards such as Ethernet (registered trademark), FDDI, and Wi-Fi (registered trademark) are used for this interface, for example. Further, the communication I/F 70 may include a wireless device.

The input-output I/F 72 is an interface via which the control device 60 communicates with various devices provided in the vehicle 10. The control device 60 is communicably connected to various devices (described later) via the input-output I/F 72.

The devices connected to the control device 60 include a global positioning system (GPS) device 76, an external sensor 78, an internal sensor 80, a drive actuator 82, a vehicle-cabin sensor 84, a seatback turning portion 86, a slider 40, the HVAC unit 50, a flow adjusting plate driving portion 88, and a shielding plate driving portion 90.

The GPS device 76 includes an antenna (not illustrated) configured to receive a signal from a GPS satellite (not illustrated), so that the GPS device 76 can measure a current position of the vehicle 10. Then, position information on the position of the vehicle 10 that is measured by the GPS device 76 is temporarily stored in the storage 68.

The external sensor 78 is a sensor group used for detection of a surrounding environment around the vehicle 10. The external sensor 78 includes, for example, a camera configured to capture an image of a predetermined range, a millimeter wave radar configured to transmit an exploration wave to the predetermined range, and a laser imaging detection and ranging (LIDAR) system configured to perform scanning on the predetermined range. Further, data acquired by the external sensor 78 is temporarily stored in the storage 68.

The internal sensor 80 is a sensor group used for detection of a traveling state of the vehicle 10 and includes, for example, a vehicle speed sensor, an acceleration sensor, and a yaw rate sensor. Further, data acquired by the internal sensor 80 is temporarily stored in the storage 68.

The drive actuator 82 includes a throttle actuator, a brake actuator, and a steering actuator (not illustrated), and driving devices (not illustrated) including an accelerator device, a braking device, and a steering device are controllable by the drive actuator 82.

The vehicle-cabin sensor 84 is a sensor group used for detection of an environment inside the vehicle cabin 12. The vehicle-cabin sensor 84 includes, for example, a vehicle-cabin camera configured to capture an image of an occupant 30 seated in the seat 28, a thermometer configured to measure the temperature inside the vehicle cabin 12, and a hygrometer configured to measure the humidity inside the vehicle cabin 12. Imaging data of the image of the occupant 30 that is captured by the vehicle-cabin camera is stored in the storage 68 as occupant candidate data, and environment data inside the vehicle cabin 12 that is output from the thermometer and the hygrometer is temporarily stored in the storage 68.

The seatback turning portion 86 is provided in the seat support portion 38 as illustrated in FIG. 1 and includes a motor and so on. The seatback turning portion 86 is driven by a control signal from the control device 60 so as to turn the seatback 34 around a turning shaft S1 extending in a seat width direction, so that the inclination angle of the seatback 34 from the seat cushion 32 is adjustable.

Note that the seatback turning portion 86 is also operable by the occupant 30 via a seat operation device (not illustrated). Further, the seatback turning portion 86 can output, to the control device 60, a signal corresponding to the inclination angle of the seatback 34 from the seat cushion 32 that is adjusted by the seat operation device, and the inclination angle is stored in the storage 68 as part of preference data of the occupant 30.

The slider 40 is provided between the seat support portion 38 and the floor panel 26 as described above. The slider 40 is operated in response to a control signal from the control device 60, so that the seat 28 and the seat support portion 38 can be moved in the vehicle front-rear direction. Further, the slider 40 is provided with a seat position detection sensor configured to detect the position of the seat 28 in the vehicle front-rear direction, so that the slider 40 also functions as a seat position detecting portion.

Note that the slider 40 is also operable by the occupant 30 via the seat operation device. Further, the slider 40 can output, to the control device 60, a signal corresponding to the position of the seat 28 that is adjusted by the seat operation device, and the position is stored in the storage 68 as part of the preference data of the occupant 30.

The HVAC unit 50 can adjust the temperature and the airflow rate of the wind W blown out of the HVAC unit 50 based on a control signal from the control device 60. Note that the HVAC unit 50 is operable by the occupant 30 via an air-conditioning operation device (not illustrated). When the occupant 30 operates the air-conditioning operation device, the temperature and the airflow rate of the wind W can be adjusted.

Note that the HVAC unit 50 is switched between an operating state and a non-operating state by the operation on the air-conditioning operation device by the occupant 30, and a control signal indicating that the HVAC unit 50 is in the operating state or the non-operating state is output to the control device 60 from the air-conditioning operation device. Further, the HVAC unit 50 can output, to the control device 60, a signal corresponding to air-conditioning setting data set by the occupant 30, and the air-conditioning setting data is stored in the storage 68 as part of the preference data of the occupant 30.

As illustrated in FIG. 3, the flow adjusting plate driving portion 88 includes a motor 92, a motor mount 94, and a motor driver (not illustrated). When the motor 92 is operated in response to a signal from the control device 60, the flow adjusting plate driving portion 88 can drive a pair of "flow adjusting plates 96" as a flow adjusting portion placed in the vehicle cabin 12.

Figure 4:
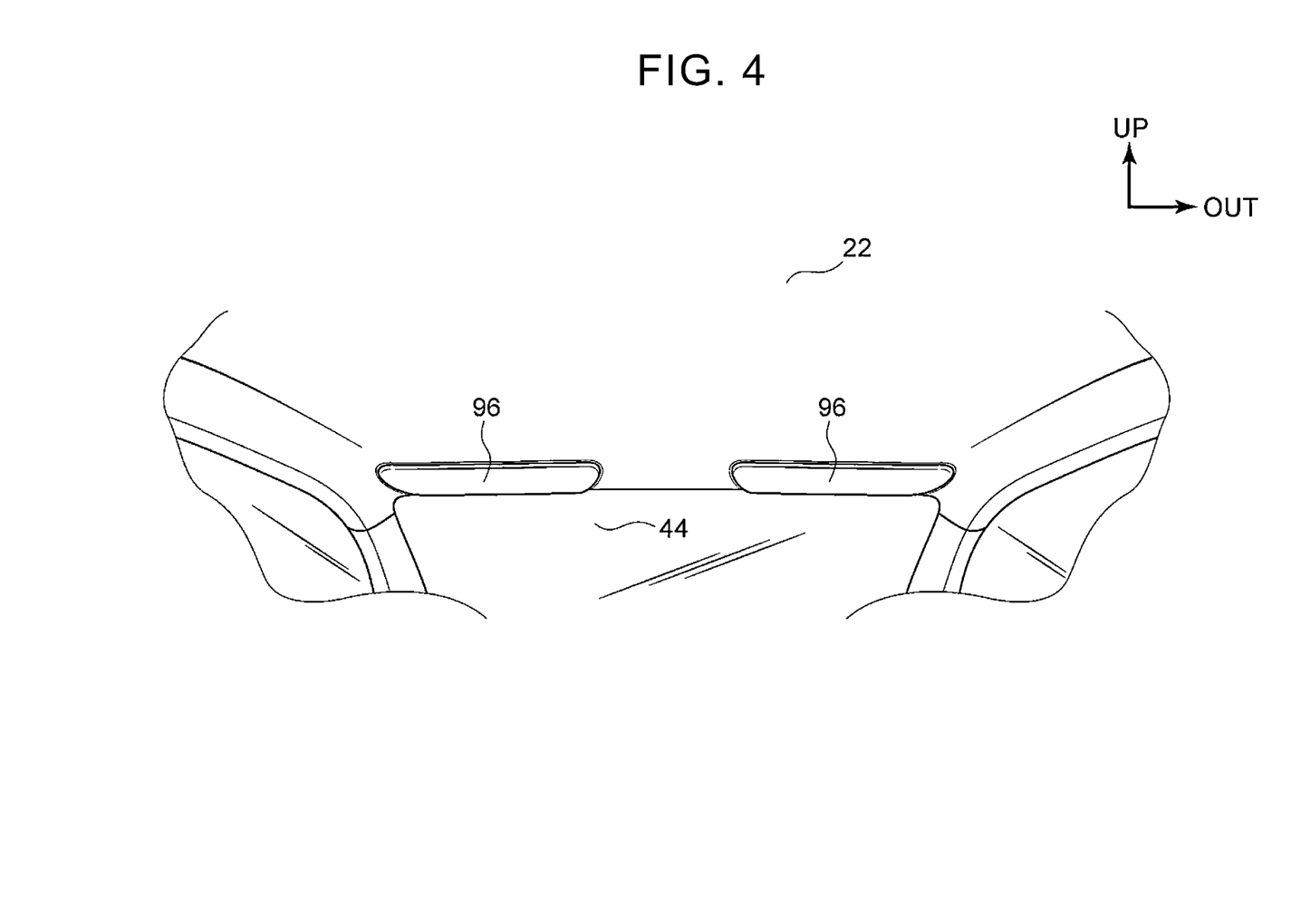
FIG. 4 is a perspective view schematically illustrating the configuration around the flow adjusting portioning in the vehicle according to the first embodiment, the configuration being viewed from the rear side in the vehicle front-rear direction.

More specifically, as also illustrated in FIG. 4, the flow adjusting plates 96 have a plate shape extending in the vehicle width direction and are placed to be distanced from each other in the vehicle width direction along an upper edge part of the front windshield 44. Further, a shaft portion 98 extending in the vehicle width direction is provided in front end parts, in the vehicle front-rear direction, of the flow adjusting plates 96. The shaft portion 98 is connected to an output shaft (not illustrated) of the motor 92 via a coupling (not illustrated).

When the motor 92 operates, the flow adjusting plate 96 turns around a turning shaft S2 extending in the vehicle width direction, so that an angle θ of the flow adjusting plate 96 from the inner surface 44A of the front windshield 44 is adjustable. Note that the angle θ indicates an angle of a lower corner in the vehicle up-down direction among corners formed by a lower surface 96A of the flow adjusting plate 96 and a tangent L2 of the inner surface 44A, when the flow adjusting plate 96 is viewed from the vehicle width direction. The tangent L2 passes through an intersection X between the inner surface 44A and a straight line L1 passing through the turning shaft S2 and extending in the vehicle front-rear direction.

Further, the flow adjusting plate 96 is stored in a recessed portion 100 at normal time. The recessed portion 100 is formed in a front peripheral edge part, in the vehicle front-rear direction, of the roof trim 22 such that the recessed portion 100 is recessed upward in the vehicle up-down direction. In this state, the lower surface 96A of the flow adjusting plate 96 constitutes part of the ceiling surface of the vehicle cabin 12.

Note that the motor 92 is supported by a motor mount 94, and the motor mount 94 is attached, via a fastening member (not illustrated), to a base portion 102 provided on an upper surface (back surface) 22C of the roof trim 22.

Further, the flow adjusting plate driving portion 88 is also operable by the occupant 30 via a flow adjusting operation device (not illustrated). When the occupant 30 operates the flow adjusting operation device, the angle θ can be adjusted. The flow adjusting plate driving portion 88 can output, to the control device 60, a signal corresponding to the angle θ, and the angle θ adjusted by the occupant 30 is stored in the storage 68 as part of the preference data of the occupant 30.

Figure 5:
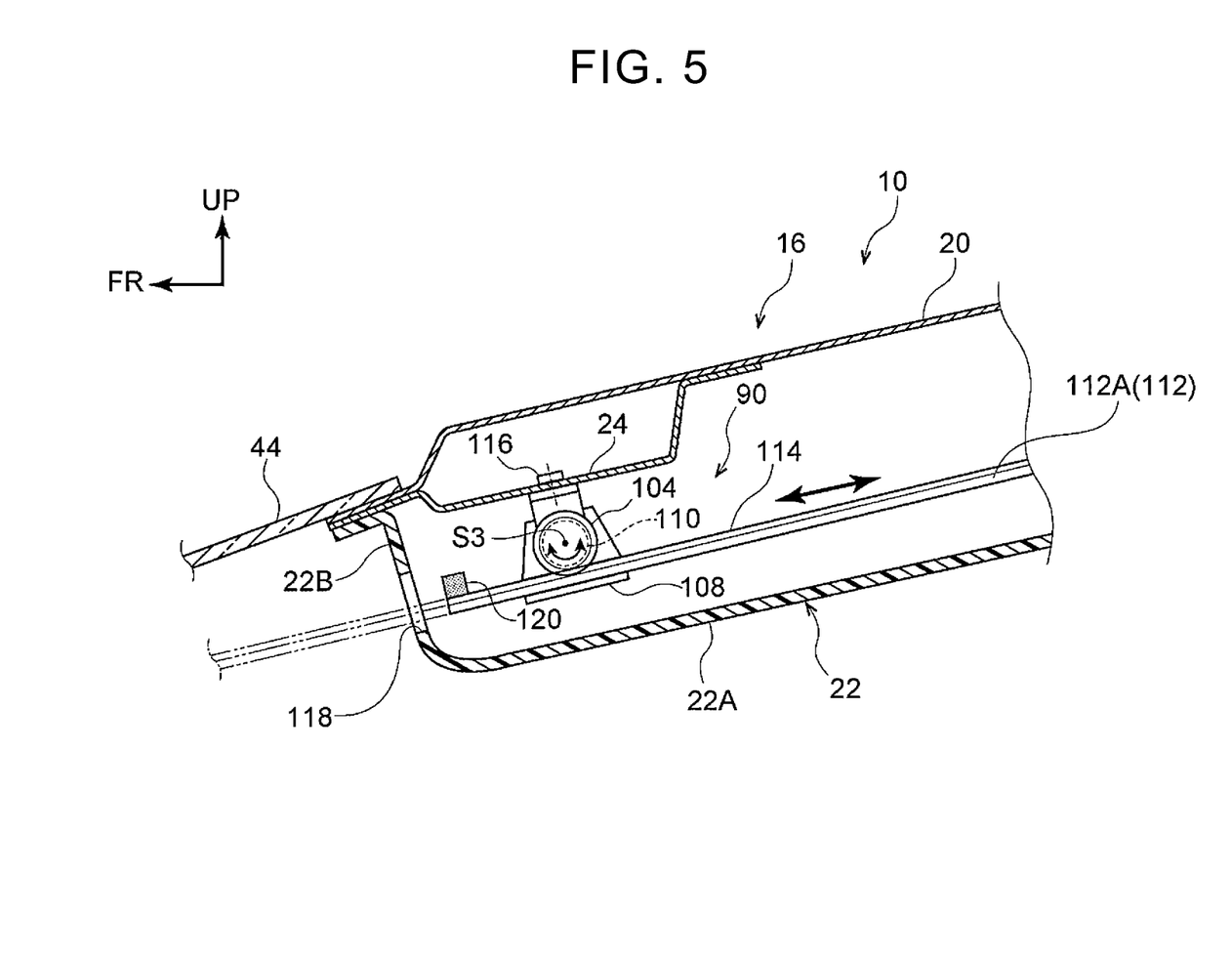
FIG. 5 is a sectional view schematically illustrating a configuration around a shielding portion in the vehicle according to the first embodiment, the configuration being viewed from the vehicle width direction.

As illustrated in FIG. 5, the shielding plate driving portion 90 includes a pair of pinions 104, a pair of mounts 106, a pair of guides 108, a motor 110, and a motor driver (not illustrated). When the motor 110 is operated in response to a signal from the control device 60 based on a signal from a shielding operation device (not illustrated) to be operated by the occupant 30, a "shielding plate 112" as a shielding portion can be driven.

More specifically, the shielding plate 112 is placed above the ceiling surface portion 22A of the roof trim 22 in the vehicle up-down direction, and the shielding plate 112 is constituted by a polarizer having a flexible plate shape extending along the ceiling surface portion 22A. Further, upper parts of opposite end portions 112A, in the vehicle width direction, of the shielding plate 112 are provided with rack portions 114 along the vehicle front-rear direction.

The pinions 104 are placed for the opposite end portions 112A of the shielding plate 112 and are engaged with the rack portions 114. Further, the pinion 104 on a first side in the vehicle width direction is connected to an output shaft (not illustrated) of the motor 110. When the motor 110 operates, the pinion 104 turns around a turning shaft S3 extending in the vehicle width direction, so that the position of the shielding plate 112 in the vehicle front-rear direction can be adjusted. Note that the motor 110 is supported by the mount 106 on the first side in the vehicle width direction, and the mount 106 is fixed to a weld nut 116 via a fastening member (not illustrate), the weld nut 116 being provided in the roof reinforcement 24.

Further, the guides 108 are also attached to the mounts 106, and the shielding plate 112 is supported by the guides 108 from the lower side in the vehicle up-down direction. Note that the pinion 104 on a second side in the vehicle width direction is attached to the mount 106 on the second side in the vehicle width direction via a bearing (not illustrated).

In the meantime, the front wall portion 22B of the roof trim 22 is provided with a slit portion 118 in which the shielding plate 112 is insertable, and the shielding plate 112 is extendable to outside the roof trim 22 from the slit portion 118.

As illustrated in FIG. 1, when the shielding plate 112 is extended along the front windshield 44, light such as sunlight passing through the front windshield 44 and applied to the occupant 30 from the front windshield 44 side is partially blocked by the shielding plate 112. Note that a buffer material 120 is provided in a distal end part of the shielding plate 112 such that the buffer material 120 is placed on the front windshield 44 side, and hereby, the front windshield 44 is restrained from making contact with the shielding plate 112.

Figure 7:
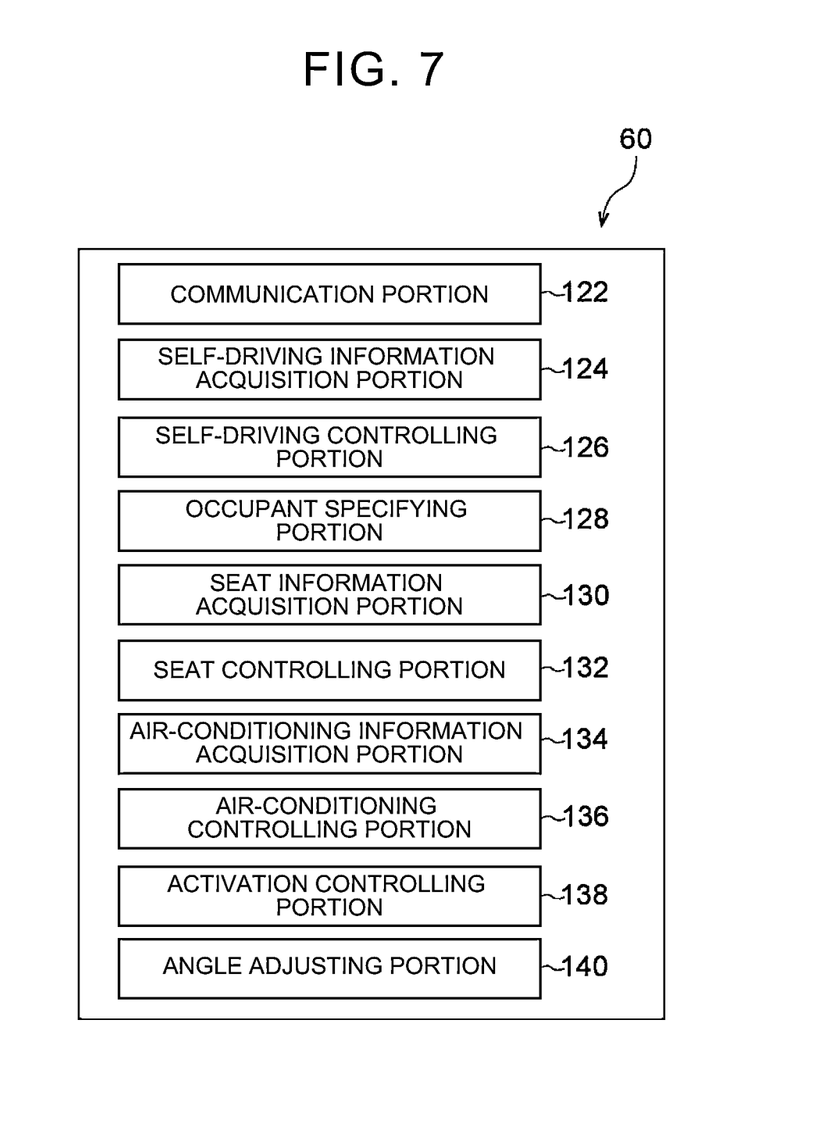
FIG. 7 is a block diagram illustrating a configuration of a control device provided in the vehicle according to the first embodiment.

Next will be described the functional configuration of the control device 60 with reference to FIG. 7. When the CPU 62 reads and executes an execution program stored in the ROM 64, the control device 60 functions as an assembly of a communication portion 122, a self-driving information acquisition portion 124, a "self-driving controlling portion 126," an occupant specifying portion 128, a seat information acquisition portion 130, a seat controlling portion 132, an air-conditioning information acquisition portion 134, an air-conditioning controlling portion 136, an "activation controlling portion 138," and an "angle adjusting portion 140."

The communication portion 122 can transmit and receive various signals to and from a server and can acquire traffic information or the like around the vehicle 10 from the server.

The self-driving information acquisition portion 124 acquires self-driving information, that is, data necessary for self-driving of the vehicle 10. The information to be acquired by the self-driving information acquisition portion 124 includes position information on the position of the vehicle 10 that is measured by the GPS device 76, data related to the surrounding environment around the vehicle 10 that is acquired by the external sensor 78, data related to the traveling state of the vehicle 10 that is acquired by the internal sensor 80, traffic information acquired from the server, and so on. The pieces of data acquired by the self-driving information acquisition portion 124 are transmitted to the self-driving controlling portion 126.

When the vehicle 10 is switched to the self-driving mode based on an operation performed by the occupant 30, or the like, the self-driving controlling portion 126 controls the drive actuator 82 based on information acquired by the self-driving information acquisition portion 124, so that the vehicle 10 performs self-driving.

The occupant specifying portion 128 specifies the occupant 30 seated in the seat 28 by comparing imaging data of an image of the occupant 30 that is captured by the vehicle-cabin camera of the vehicle-cabin sensor 84 with occupant candidate data stored in the storage 68.

The seat information acquisition portion 130 acquires, as seat information on the occupant 30, an inclination angle of the seatback 34 from the seat cushion 32 and a position of the seat 28 from preference data of the occupant 30 specified by the occupant specifying portion 128. The inclination angle of the seatback 34 and the position of the seat 28 to be acquired herein are a previous inclination angle and a previous position set at the time of previous adjustment of the seat 28 by the occupant 30.

The seat controlling portion 132 controls the seatback turning portion 86 and the slider 40 based on the seat information on the occupant 30 that has been acquired by the seat information acquisition portion 130, so that the inclination angle of the seatback 34 from the seat cushion 32 and the position of the seat 28 are shifted to a state preferred by the occupant 30.

The air-conditioning information acquisition portion 134 acquires air-conditioning setting data and an angle θ of the flow adjusting plate 96 from the preference data of the occupant 30 specified by the occupant specifying portion 128. The air-conditioning setting data and the angle θ of the flow adjusting plate 96 to be acquired herein are previous air-conditioning setting data and a previous angle θ set at the time of previous riding of the occupant 30 on the vehicle 10.

The air-conditioning controlling portion 136 controls the HVAC unit 50 based on the air-conditioning setting data of the occupant 30 that has been acquired by the air-conditioning information acquisition portion 134 such that the temperature and the airflow rate of the wind W are adjusted to a state preferred by the occupant 30. Note that the air-conditioning controlling portion 136 may be configured to adjust the temperature and the airflow rate of the wind W based on the air-conditioning setting data of the occupant 30 and the environment data inside the vehicle cabin 12.

When an activation signal to be input at the time of activating the HVAC unit 50 is input, the activation controlling portion 138 activates the flow adjusting plate driving portion 88 so as to adjust the angle θ of the flow adjusting plate 96 to the angle θ acquired by the air-conditioning information acquisition portion 134.

In a case where the latest position of the seat 28 that is stored in the storage 68 is different from the preference data of the occupant 30, the angle adjusting portion 140 adjusts the angle θ of the flow adjusting plate 96 based on the latest position of the seat 28 that is stored in the storage 68 so that the correlation between the angle θ in the preference data and the position of the seat 28 is maintained.

Operation and Effect of Present Embodiment

Next will be described the operation and effect of the present embodiment.

In the present embodiment, as illustrated in FIG. 1, the HVAC unit 50 is provided in the vehicle 10, and air-conditioning inside the vehicle cabin 12 of the vehicle 10 is performed by the HVAC unit 50.

In the meantime, in order to cause the wind W from the HVAC unit 50 to flow toward the seat on the front side in the vehicle front-rear direction, it is necessary to provide, in the instrument panel 48, a blow opening via which air can be sent toward the seat. Accordingly, it is necessary to expand the instrument panel 48 in the vehicle front-rear direction.

Here, in the present embodiment, as also illustrated in FIG. 2, the instrument panel 48 is placed on the front side in the vehicle front-rear direction inside the vehicle cabin 12, and the blow opening portion 54 for the wind W from the HVAC unit 50 is provided on the top surface of the instrument panel 48. The wind W blown out of the HVAC unit 50 passes through the blow opening portion 54, so that the wind W flows along the inner surface 44A of the front windshield 44, the inner surface 44A facing the inner side of the vehicle cabin 12.

Further, the flow adjusting plate 96 is placed along the upper edge part of the front windshield 44, so that the flow of the wind W flowing along the inner surface 44A of the front windshield 44 can be adjusted by the flow adjusting plate 96. Further, the angle θ of the flow adjusting plate 96 from the inner surface 44A is adjustable, so that the flow adjusting plate 96 allows the direction of the wind W flowing along the inner surface 44A to be directed toward the seat 28 placed behind the instrument panel 48 in the vehicle front-rear direction.

As a result, in the present embodiment, the wind W blown out of the HVAC unit 50 can be sent toward the seat 28 without providing, in the instrument panel 48, a blow opening via which the wind can be sent toward the seat 28. Accordingly, in the present embodiment, while the air-conditioning environment inside the vehicle cabin 12 is maintained in a good state, it is possible to reduce the width of the instrument panel 48 in the vehicle front-rear direction.

Further, in the present embodiment, as illustrated in FIG. 3, in a state where the HVAC unit 50 is not activated, the flow adjusting plate 96 is stored in the roof trim 22 constituting the ceiling surface of the vehicle cabin 12, so that the flow adjusting plate 96 can be made inconspicuous. Accordingly, in the present embodiment, it is possible to secure the design property inside the vehicle cabin 12 in a state where the HVAC unit 50 is not activated.

Further, in the present embodiment, the control device 60 that can drive the flow adjusting plate 96 is provided. At the time of activating the HVAC unit 50, the control device 60 drives the flow adjusting plate 96 from a non-usage state where the flow adjusting plate 96 is stored in the roof trim 22 to a usage state where the flow of the wind W flowing along the inner surface 44A of the front windshield 44 is adjustable by the flow adjusting plate 96.

Figure 8:
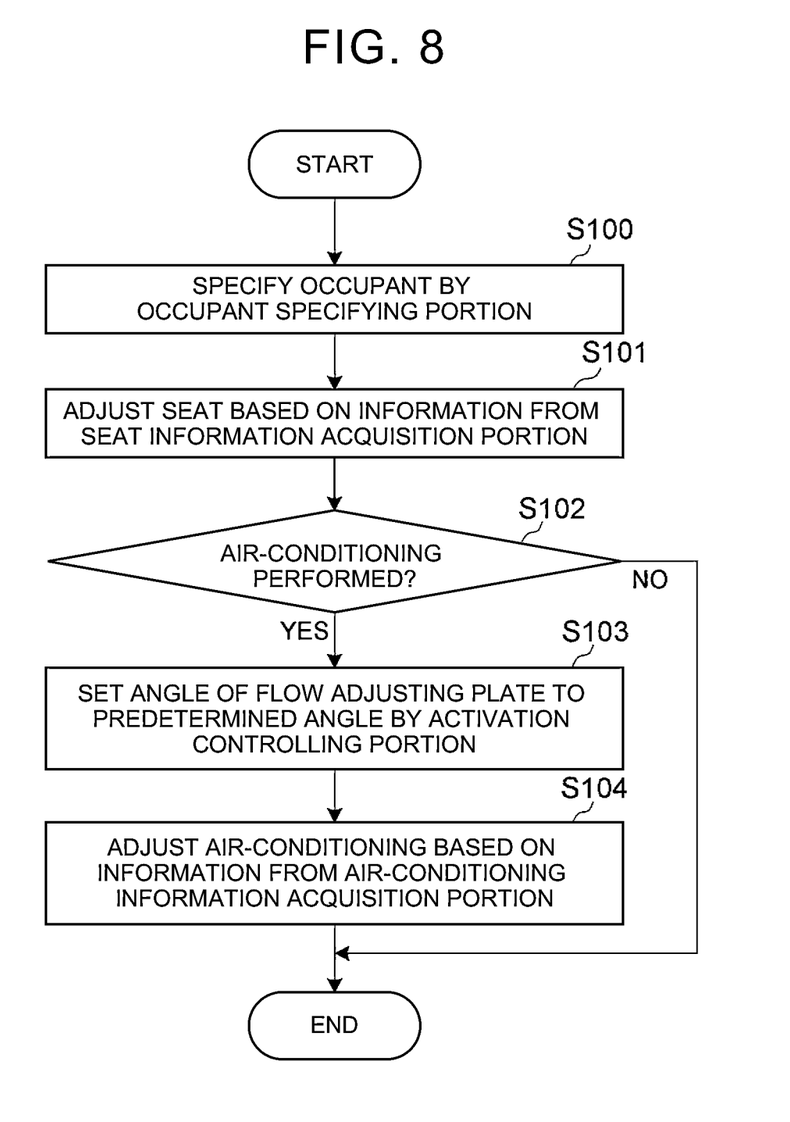
FIG. 8 is a flowchart illustrating an example of a process to be executed by the control device provided in the vehicle according to the first embodiment.

Mainly with reference to the flowchart illustrated in FIG. 8, the following describes a control procedure for the seat 28, the HVAC unit 50, and the flow adjusting plate 96 by the control device 60. The control procedure is started when the control device 60 receives a predetermined control signal.

When the control procedure is started, the CPU 62 of the control device 60 functions as the occupant specifying portion 128 in step S100, so that the occupant 30 seated in the seat 28 is specified. Then, the control procedure proceeds to step S101.

In step S101, the CPU 62 functions as the seat controlling portion 132, so that the seat 28 is adjusted based on seat information on the occupant 30 that is acquired by the seat information acquisition portion 130. Then, the control procedure proceeds to step S102.

In step S102, the CPU 62 determines whether the HVAC unit 50 is in the operating state or the non-operating state, based on a signal input from the air-conditioning operation device. In a case where the HVAC unit 50 is in the operating state (step S102: YES), the control procedure proceeds to step S103. In a case where the HVAC unit 50 is in the non-operating state (step S102: NO), the control procedure is ended.

In step S103, the CPU 62 functions as the activation controlling portion 138, so that the angle θ of the flow adjusting plate 96 is set to a predetermined angle. Then, the control procedure proceeds to step S104.

In step S104, the CPU 62 functions as the air-conditioning controlling portion 136, so that the HVAC unit 50 is adjusted based on air-conditioning setting data of the occupant 30 that is acquired by the air-conditioning information acquisition portion 134. Then, the control procedure is ended.

As such, in the present embodiment, the direction of the wind W blown out of the HVAC unit 50 can be adjusted without performing a manual operation.

Further, in the present embodiment, the position of the seat 28 in the vehicle front-rear direction can be changed to a position preferred by the occupant 30 by means of the slider 40.

In the meantime, when the position of the seat 28 in the vehicle front-rear direction is changed, the positional relationship between the flow adjusting plate 96 and the seat 28 is changed. Accordingly, it is necessary to adjust the angle θ of the flow adjusting plates 96 from the inner surface 44A of the front windshield 44 again. Meanwhile, from the viewpoint of convenience for the occupant 30, it is not preferable that the adjustment of the flow adjusting plate 96 be performed by the occupant 30 every time the position of the seat 28 in the vehicle front-rear direction is changed.

Here, in the present embodiment, since the flow adjusting plate 96 is driven by the control device 60 functioning as the angle adjusting portion 140, the angle θ of the flow adjusting plates 96 from the inner surface 44A of the front windshield 44 can be adjusted. Further, the position of the seat 28 in the vehicle front-rear direction can be detected by the slider 40 configured to move the seat 28. The control device 60 adjusts the angle θ of the flow adjusting plate 96 from the inner surface 44A based on the position of the seat 28 that is detected by the slider 40.

On this account, in the present embodiment, the angle θ of the flow adjusting plate 96 from the inner surface 44A of the front windshield 44 can be adjusted to an appropriate angle for the seat 28 without the occupant 30 operating the flow adjusting plate 96. As a result, the occupant 30 can spend time comfortably inside the vehicle cabin 12 without impairing convenience for the occupant 30.

Further, in the present embodiment, as illustrated in FIG. 5, the shielding plate 112 is placed on the upper side, in the vehicle up-down direction, of the vehicle cabin 12, and light applied from the front windshield 44 side to the occupant 30 seated in the seat 28 can be at least partially blocked by the shielding plate 112. Accordingly, for example, in a case where sunlight is applied from the front windshield 44 side to the occupant 30 seated in the seat 28, it is possible to reduce the amount of the light applied to the occupant 30 side.

Further, in the present embodiment, the shielding plate 112 is extendable from the roof trim 22 along the inner surface 44A of the front windshield 44. Accordingly, it is possible to restrain the shielding plate 112 from hindering the wind W the flow of which is adjusted by the flow adjusting plate 96. Accordingly, in the present embodiment, while the air-conditioning environment inside the vehicle cabin 12 is maintained in a good state, it is possible to secure the field of view of the occupant 30.

Further, in the present embodiment, the control device 60 functions as the self-driving controlling portion 126 so as to control the motion of the vehicle 10 such that the vehicle 10 can perform self-driving. On this account, in the present embodiment, when the position of the seat 28 in the vehicle front-rear direction is changed or the like, the occupant 30 seated in the seat 28 can take a posture other than a driving position. Further, as described above, the angle θ of the flow adjusting plates 96 from the inner surface 44A of the front windshield 44 is adjusted in accordance with the position of the seat 28 in the vehicle front-rear direction. Accordingly, in the present embodiment, the occupant 30 can take various postures during traveling of the vehicle 10, and the air-conditioning environment around the occupant 30 can be maintained in a good state.

In addition, in the present embodiment, as illustrated in FIG. 1, the vertical wall portion 48B constituting part of the instrument panel 48 is placed in front of the seat 28 in the vehicle front-rear direction. The vertical wall portion 48B is extended downward in the vehicle up-down direction from a rear peripheral edge part, in the vehicle front-rear direction, of the blow opening portion 54. On this account, in the present embodiment, it is possible to restrain the width of the instrument panel 48 in the vehicle front-rear direction to a minimum requirement. Accordingly, in the present embodi-

Second Embodiment

Figure 9:
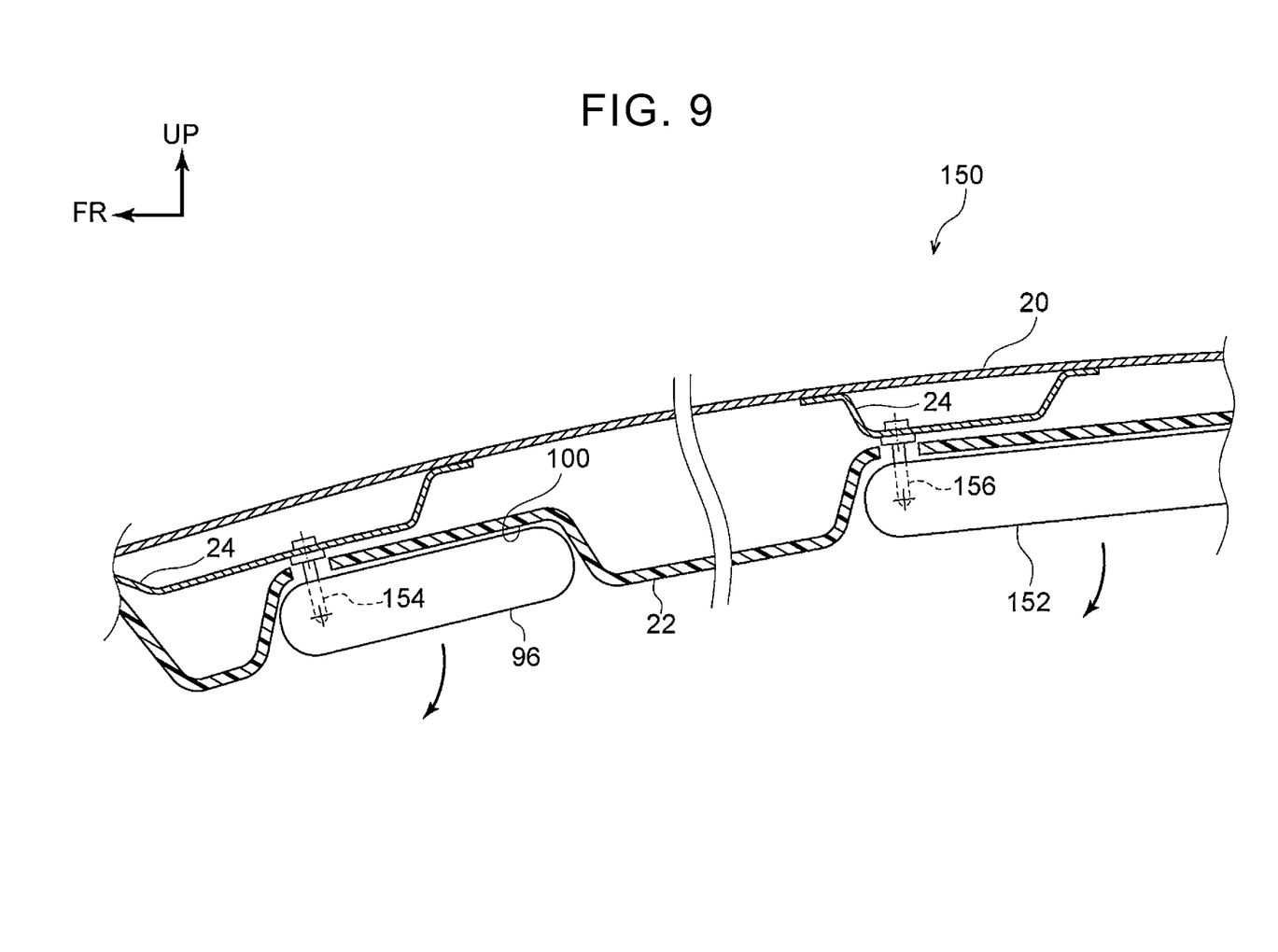
FIG. 9 is a sectional view schematically illustrating a configuration around a flow adjusting portion in a vehicle according to a second embodiment, the configuration being viewed from the vehicle width direction.

With reference to FIG. 9, the following describes a second embodiment of the vehicle according to the present disclosure. Note that the same constituent as a constituent in the first embodiment has the same reference sign as that of the constituent in the first embodiment, and descriptions thereof are omitted.

A "vehicle 150" in the present embodiment has a configuration basically similar to that of the vehicle 10 in the first embodiment. However, the vehicle 150 in the present embodiment is different from the vehicle 10 in the first embodiment in that the angle θ of the flow adjusting plate 96 is adjusted manually and that a "sun visor 152" as a shielding portion is provided instead of the shielding plate 112.

More specifically, the flow adjusting plate 96 is attached to a shaft 154 such that the flow adjusting plate 96 is turnable around the vehicle width direction, and the shaft 154 is attached to the roof reinforcement 24 placed on the frontmost side in the vehicle front-rear direction.

In the meantime, the sun visor 152 is placed behind the flow adjusting plate 96 in the vehicle front-rear direction and is attached to a shaft 156 such that the sun visor 152 is turnable around the vehicle width direction. Note that the shaft 156 is attached to the roof reinforcement 24 placed, in the vehicle front-rear direction, behind the roof reinforcement 24 to which the flow adjusting plate 96 is attached.

With such a configuration, a mechanism for the adjustment of the flow adjusting plate 96 can be simplified in comparison with a configuration where the flow adjusting plate 96 is adjusted by an electronic control. Further, it is possible to use the sun visor 152 of other vehicle types, and it is also possible to restrain the sun visor 152 from hindering the wind W.

Supplementary Description of Embodiments (1) In the above embodiments, the flow adjusting plate 96 is employed as a flow adjusting portion. However, the present disclosure is not limited to this. For example, the flow adjusting portion may be constituted by a plurality of tubular portions and configured to adjust the direction of the wind W. Further, a plurality of rotating shafts for the flow adjusting portion may be set in accordance with the specification or the like of the vehicle so that the flow adjusting portion is turnable in a plurality of directions, or the number of the flow adjusting portions may be changed appropriately.

(2) Further, in the first embodiment, the shielding plate 112 is driven by the motor 110. However, it is also possible to employ a configuration to manually adjust the position of the flow adjusting plate 96 in accordance with the specification or the like of the vehicle.

What is claimed is:

1. A vehicle, comprising:
an air-conditioning device provided in the vehicle and configured to perform air-conditioning inside a vehicle cabin of the vehicle;
a blow opening portion provided on a top surface of an instrument panel placed on a front side in a vehicle front-rear direction inside the vehicle cabin, the blow opening portion being configured to cause wind blown out of the air-conditioning device to flow along an inner surface of a front windshield placed in front of the instrument panel in the vehicle front-rear direction, the inner surface facing an inner side of the vehicle cabin;
a vehicle seat placed behind the instrument panel in the vehicle front-rear direction;
a flow adjusting portion placed along an upper edge part of the front windshield to allow an angle of the flow adjusting portion from the inner surface to be adjustable, the flow adjusting portion being configured to adjust flow of the wind flowing along the inner surface toward the vehicle seat;
a roof trim constituting a ceiling surface of the vehicle cabin, the roof trim having
a recessed portion at a front peripheral edge part of the roof trim in the vehicle front-rear direction, the recessed portion being recessed upward in a vehicle up-down direction, and
a slit portion at a front wall portion of the roof trim, and above the recessed portion;
a shielding portion placed on an upper side, in the vehicle up-down direction, of the vehicle cabin, the shielding portion being configured to block at least a part of light from the front windshield to an occupant seated in the vehicle seat, wherein the shielding portion is extendable from the roof trim along the inner surface; and
a buffer material, on an upper surface of the shielding portion in the vehicle up-down direction, and at a front distal end part of the shielding portion in the vehicle front-rear direction, wherein the buffer material is sized to fit through the slit portion, wherein
the flow adjusting portion in a non-usage state is stored in the recessed portion,
in the non-usage state, a lower surface of the flow adjusting portion constitutes a part of the ceiling surface of the vehicle cabin,
the shielding portion is configured to extend out of the roof trim and through the slit portion, from a position above the flow adjusting portion, and
the shielding portion has a plate-shaped structure.

2. The vehicle according to claim 1, further comprising:
an activation controlling portion configured to, in response to the air-conditioning device being activated, drive the flow adjusting portion from the non-usage state to a usage state, the usage state being a state where the flow of the wind flowing along the inner surface is adjusted by the flow adjusting portion.

3. The vehicle according to claim 1, further comprising:
an angle adjusting portion configured to adjust the angle by driving the flow adjusting portion; and
a seat position detecting portion configured to detect a position of the vehicle seat in the vehicle front-rear direction, wherein
the position of the vehicle seat in the vehicle front-rear direction is changeable, and
the angle adjusting portion is configured to adjust the angle based on the position of the vehicle seat, the position being detected by the seat position detecting portion.

4. The vehicle according to claim 3, further comprising:
a self-driving controlling portion configured to control motion of the vehicle to allow the vehicle to perform self-driving.

5. The vehicle according to claim 1, wherein
a vertical wall portion constituting a part of the instrument panel and placed in front of the vehicle seat in the vehicle front-rear direction is extended downward in the vehicle up-down direction from a rear peripheral edge part, in the vehicle front-rear direction, of the blow opening portion when the vertical wall portion is viewed from the vehicle width direction.

6. The vehicle according to claim 5, wherein
the blow opening portion includes a tubular main body extending in the vehicle up-down direction,
the air-conditioning device includes a duct extending in the vehicle up-down direction, and
the tubular main body of the blow opening portion is connected to the duct of the air-conditioning device.

7. A vehicle, comprising:
an air-conditioning device provided in the vehicle and configured to perform air-conditioning inside a vehicle cabin of the vehicle;
  a blow opening portion provided on a top surface of an instrument panel placed on a front side in a vehicle front-rear direction inside the vehicle cabin, the blow opening portion being configured to cause wind blown out of the air-conditioning device to flow along an inner surface of a front windshield placed in front of the instrument panel in the vehicle front-rear direction, the inner surface facing an inner side of the vehicle cabin;
  a vehicle seat placed behind the instrument panel in the vehicle front-rear direction;
  a flow adjusting portion placed along an upper edge part of the front windshield to allow an angle of the flow adjusting portion from the inner surface to be adjustable, the flow adjusting portion being configured to adjust flow of the wind flowing along the inner surface toward the vehicle seat;
  a roof trim constituting a ceiling surface of the vehicle cabin, the roof trim having a recessed portion at a front peripheral edge part of the roof trim in the vehicle front-rear direction, the recessed portion being recessed upward in a vehicle up-down direction; and
  a shielding portion placed on an upper side, in the vehicle up-down direction, of the vehicle cabin, the shielding portion being configured to block at least a part of light from the front windshield to an occupant seated in the vehicle seat, wherein
the flow adjusting portion in a non-usage state is stored in the recessed portion,
in the non-usage state, a lower surface of the flow adjusting portion constitutes a part of the ceiling surface of the vehicle cabin, and
the shielding portion is placed entirely behind the flow adjusting portion in the vehicle front-rear direction.

* * * * *